April 9, 1940.　　　J. L. GETAZ　　　2,196,911
SYSTEM FOR HEATING AND REFRIGERATION
Filed Oct. 28, 1935　　　2 Sheets-Sheet 1

INVENTOR

April 9, 1940.                J. L. GETAZ                2,196,911
                   SYSTEM FOR HEATING AND REFRIGERATION
                     Filed Oct. 28, 1935        2 Sheets-Sheet 2
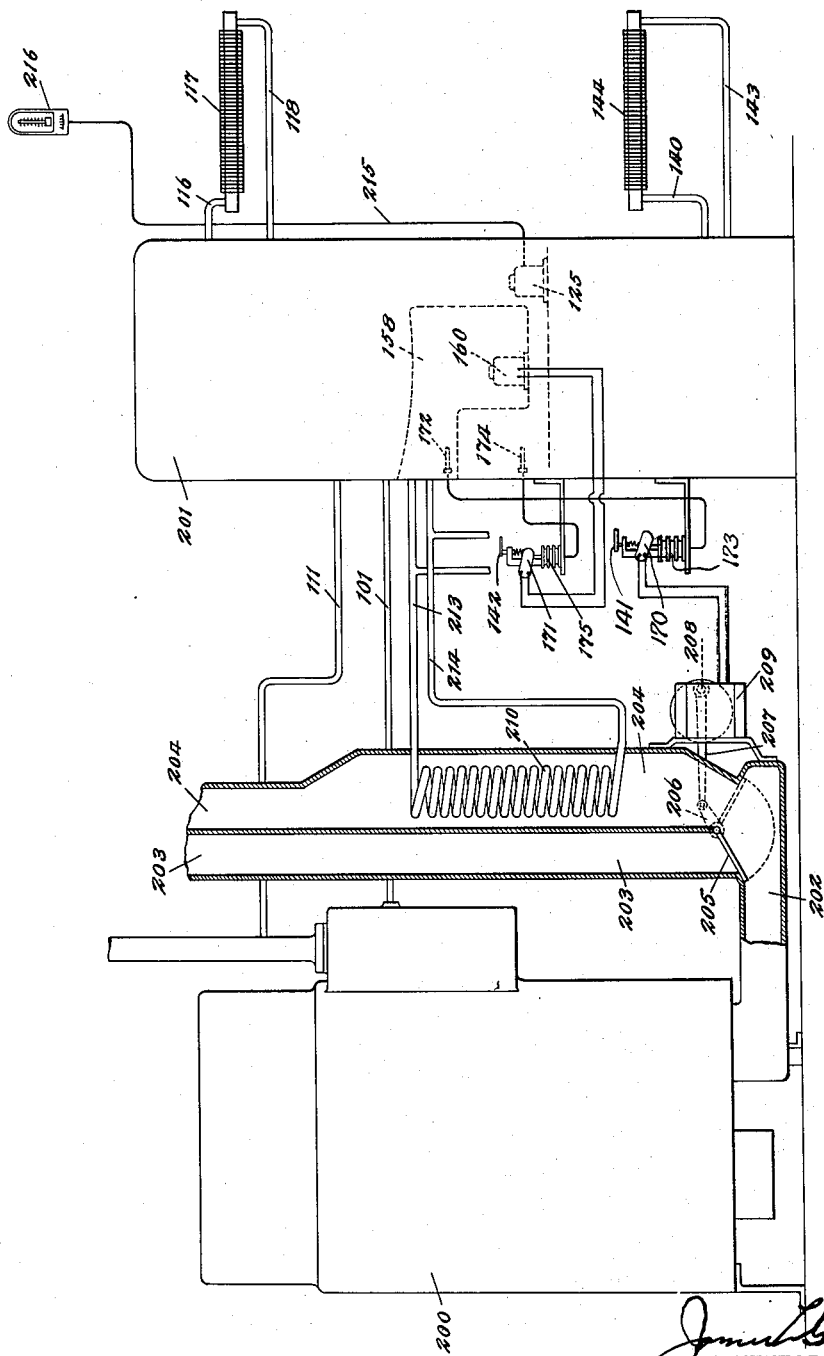
Fig. 2
INVENTOR Patented Apr. 9, 1940

2,196,911

UNITED STATES PATENT OFFICE 2,196,911

SYSTEM FOR HEATING AND REFRIGERATION

James L. Getaz, Maryville, Tenn., assignor to Servel, Inc., New York, N. Y., a corporation of Delaware Application October 28, 1935, Serial No. 47,060

18 Claims. (Cl. 62—118)

This invention relates to a heating system in which a refrigerating unit or a combination of such units is used in a reversed cycle as a means of supplying heat for heating buildings or for other purposes. It is a purpose of this invention to use a refrigerating machine in combination with a furnace, so as to extract a larger percentage of heat from the heat produced by combustion in the furnace.

It is also a purpose of this invention to provide automatic control for two refrigerating units in series, so as to obtain a higher temperature, for heating purpose, in the heat discharged by the condenser of the refrigerating machine. It is also a purpose of this invention to provide automatic control of these refrigerating units so that they may be used for refrigeration, when they are not in use as part of the heating system.

The following specifications and drawings refer to refrigerating machines of the absorption type, but the principles involved are applicable to all types of refrigerating machines.

Fig. 2 is a diagrammatic view of an absorption machine operating in combination with a furnace, as a source of heat.

Figure 1:
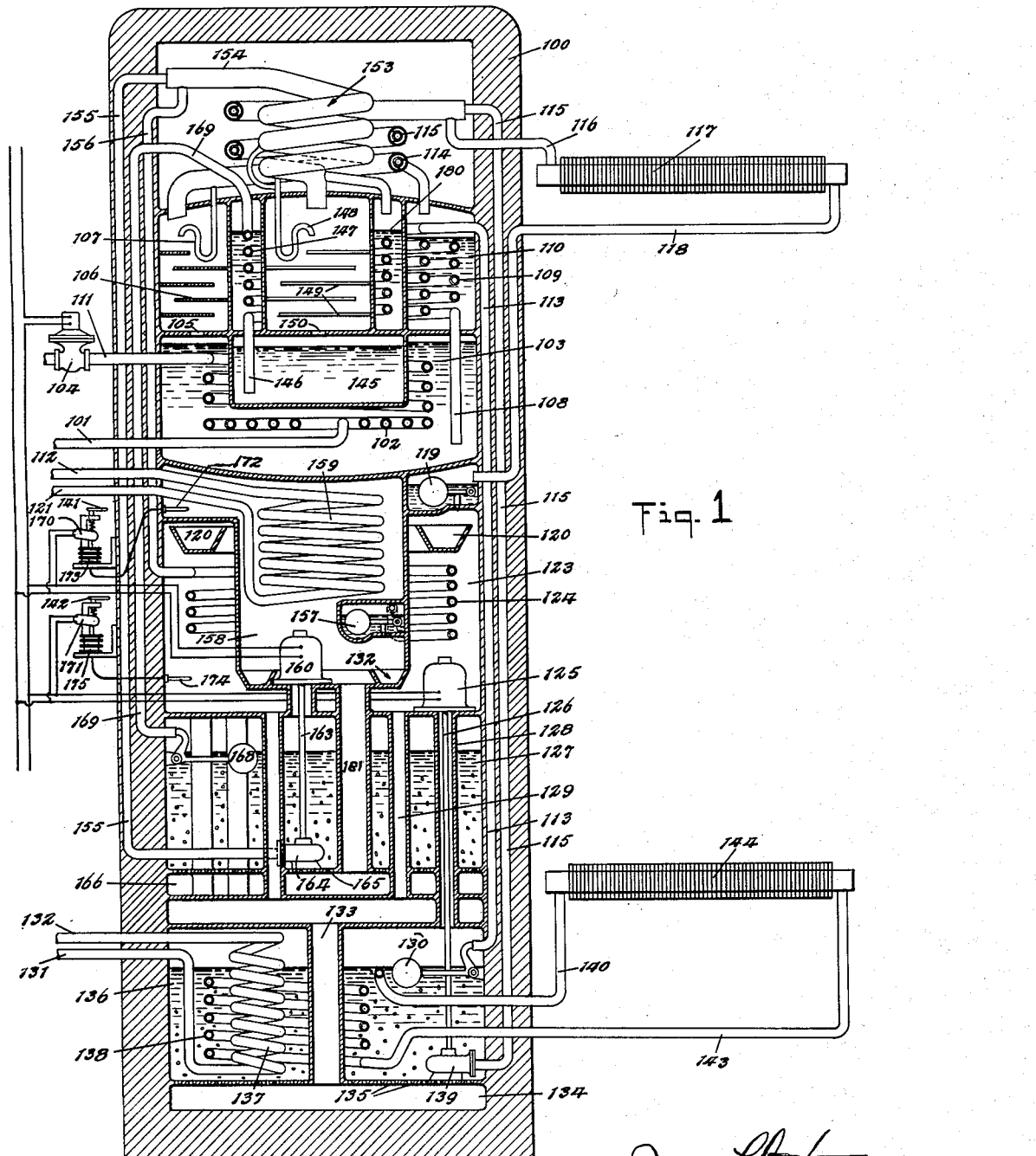
Fig. 1 is a diagrammatic section of a two stage absorption refrigerating machine, as used for refrigeration.

In Fig. 1 is shown two absorption units combined into one apparatus so as to obtain direct transfer of heat from one unit to the other. The cooler 123 of the high pressure unit is also the condenser of the low pressure unit. Below we will refer to the low pressure unit as A and the high pressure unit as B. The A generator 145 is shown within the B generator 103 and derives its heat from the aqua ammonia in the B generator.

The operation of the A unit is as follows: The ammonia vapor passes from the generator 145 through the analyzer 149, rectifier 153 and pipe 156 to the condensing coil 124. The condensed liquid ammonia passes through the float expansion valve 157 to the receiver 132 and is evaporated in the A cooler 158. This vapor then passes through pipe 181 and bubbles up through the perforated plate 165 into the A absorber 127. The strong liquor is driven by the pump 164 through the pipe 155 and through the rectifier 154 to the heat exchanger 180. From the heat exchanger it passes through the analyzer 149 to the generator. The pump is driven by the motor 160 which is regulated by the thermostat 173. This is controlled by the temperature in the A cooler through the thermostatic bulb 172. The weak liquor passes from the bottom of the generator through pipe 146 and the coil 147 in the exchanger, through pipe 169 to the absorber. The flow of the weak liquor into the A absorber is controlled by the float valve 168. In the cooler 158 in Fig. 1 is shown the brine coil 159 with an inlet pipe 112 and a discharge pipe 121. The circulation of brine in this coil is used to extract heat for refrigeration when the absorption unit is used as a refrigerating system, and is used to extract heat from flue gases of a furnace, as described later, when the absorption unit is used to supply heat.

The operation of the B unit is as follows: The generator 103 is heated by the steam coils 102. The ammonia vapor passes through the analyzer 106, the rectifier 114, pipe 116, the radiator condenser 117. The condensed ammonia passes through the pipe 118 to the float expansion valve 119, and into the receiver 120 where it evaporates in the cooler 123. From the evaporator the ammonia vapor passes through tubes 129 in the A absorber. The contact of this evaporated ammonia of B system passing through a larger number of tubes in the A absorber is the means for cooling the A absorber. This ammonia vapor then passes through the pipe 133 to the underside of the B absorber where it comes up through the perforated plate 135 into the B absorber. The strong liquor is pumped by the pump 139 through the pipe 115 through the rectifier 114 to the heat exchanger 110. From there it goes through the analyzer 106 to the B generator 103. The pump is driven by the motor 125 which is regulated by the thermostat 175. This is controlled by the temperature in the B cooler through thermostatic bulb 174.

The circuit to both motors is controlled by the pressure regulator 104 on the steam line 111, so that the motors will be disconnected when the steam pressure is too low for the operation of the refrigerating units. The B absorber is cooled by a coil 138 which contains a refrigerant and is connected to the radiator 144 by pipes 140 and 143. The refrigerant being condensed in the radiator and vaporized in the absorber.

Hot water connection

The B absorber also contains a coil 137 connected to a water supply through pipe 131 and to a hot water tank through pipe 132. When water passes through the coil the absorber is cooled by an amount depending upon the quantity of hot water which is being used while the refrigerating unit is in operation.

Temperatures and pressures in the two stage system

The pressure in the B condenser will depend on the temperature at which the atmosphere can condense the ammonia. If the temperature of the condensed ammonia is 145 degrees the gage pressure will be about 400 lbs. If this temperature is 125 degrees, the pressure will be about 300 lbs. The strength of the ammonia solutions in the B system will vary with this condensing pressure. If the condenser temperature is high the strength of the weak liquor may be between 45 and 50 per cent, and the strength of the strong liquor between 50 and 55 per cent. With lower condenser temperatures the strength of these liquors will be reduced and the surplus ammonia will be accumulated in the receiver 120. The pressure in the B cooler and A condenser 123 can be regulated within certain limits by the lever 142 which adjusts the thermostat 175. If the pressure in the B condenser 117 is very high it may be necessary to use higher pressure in the B cooler. But with ordinary atmospheric temperatures the thermostat 175 may be set to provide a pressure of about 150 to 140 pounds in the B cooler. This would give a temperature of 80 to 84 degrees for the A condenser. The temperature in the A cooler is regulated by the lever 141 which adjusts the thermostat 173.

This combination of refrigerating units in two stages is automatic in its operation.

Using the absorption unit as a source of heat

The temperature at which ammonia vapor may be condensed in radiator 117 is limited by the allowable working pressure, which, as mentioned above, is about 400 lbs. gage pressure for 145 degrees and increases to about 650 lbs. for 180 degrees. For buildings which are heated by air or hot water, or in power plants where the feed water needs to be heated, a temperature may be obtained in the condenser and absorber which would be useful as a source of heat without causing the pressure to be prohibitive.

In Fig. 2 is shown the combination absorption unit of Fig. 1 used in connection with the furnace as a heating unit. In the space or duct heated by the radiators 117 and 144, is shown a thermostat 216, which starts the motor 125, when the temperature falls below a predetermined point. This motor instead of being started and stopped to produce a low temperature in the cooler is controlled to produce high temperatures in the B condenser and B absorber. However, the operation of the units will produce low temperatures in the cooler whether the operation be regulated to maintain a low temperature in the cooler or to maintain a high temperature in the condenser. In a similar manner the motor 160 is regulated by the thermostat 175 which is connected to bulb 174 in the B cooler. The temperature in the B cooler controls the temperature and pressure in the A condensing coils 124. By this means the A unit is started when its condensing temperature becomes low and stopped when this temperature becomes sufficiently high. In Fig. 2 the brine coils are shown connected by pipes 213 and 214 to a coil 210 located in the flue 204 of the furnace. The furnace has two flues; one of these 204 contain the brine coil and 203 which is the customary flue. A damper 205 between the two flues is operated by a motor driven regulator 208 and this is controlled by the thermostatic bulb 172 located in the A cooler. If the temperature in the A cooler falls below a predetermined point, the regulator 208 turns the damper to the full line position shown in Fig. 2, the flue gases pass through 204 and the heat from the flue gases heats the brine and raises the temperature in the A cooler. If the temperature in the A cooler rises above a certain point the regulator 208 turns the damper to the dotted line position, the flue gases pass up the flue 203 without coming in contact with the brine coils. The result of this arrangement is that the heat delivered by the radiators 117 and 144 is equal to the heat delivered by the steam from the boiler plus the heat absorbed by the brine coil from the flue gases, or from other space which is being refrigerated.

This method of refrigerating flue gases increases the efficiency and output of the furnace. By this means the heat lost in combustion by heating the nitrogen in the atmosphere may be reduced or entirely recovered.

In these drawings two systems of control are shown, as have been mentioned above. In Fig. 1 are shown the controls which are used when the refrigerating units are used to produce low temperatures as refrigeration is needed. The motor 160 of the A unit is controlled by thermostat 173 connected to bulb 172 in the A cooler, and motor 125 of the B unit is controlled by the thermostat 175 connected to bulb 174 in the B cooler.

In Fig. 2 are shown the controls which are used when the refrigerating units are used to produce high temperatures for heating purposes. The motor 125 of the B unit is controlled by the thermostat 216 in the space to be heated. The motor 160 of the A unit is controlled by the thermostat 175 connected to bulb 174 in the B cooler. The thermostat 173 connected to bulb 172 in the A cooler is used to regulate the flue damper 205 by means of the regulator 208.

The result of the operation of these two refrigerating units as shown in Figs. 1 and 2 is very similar as far as the temperatures obtained are concerned, and the means of obtaining these temperatures. In Fig. 1 it is desired to raise the temperature of the heat discharged to such a point that it will be readily carried away by the atmosphere without the necessity of cooling water. In Fig. 2 it is desired to raise the temperature of the heat discharged to such a point that it may be useful in heating the air in the space to be heated.

The difference in the controls shown in these two figures, is that in Fig. 1 the operation of the two units is determined by the refrigeration needed, and in Fig. 2 their operation is determined by the amount of heat needed.

I claim:

1. A heating system comprising, a refrigerating system comprising two refrigerating units in series, one unit operating at a high pressure and the other at low pressure, the heat discharged by the high pressure unit being used for heating, means for regulating the operation of the high pressure unit by the temperature of the space being heated and means for regulating the operation of the low pressure unit by the temperature in the cooler of the high pressure unit.

2. A heating system, comprising a furnace, a flue for the gases of combustion of said furnace, an absorption refrigerating system comprising two refrigerating units in series, one unit operating at high pressure and the other at low pressure, means for supplying heat from said furnace to the generators of said refrigerating units and means for supplying heat from the flue gases of said furnace to the cooler of said low pressure unit, means for using the heat discharged by the condenser and absorber of the high pressure unit for heating purposes, means for regulating the operation of the high pressure unit by the temperature of the space being heated, means for regulating the operation of the low pressure unit by the temperature of the cooler of the high pressure unit and means for automatically regulating the supply of heat from the flue gases of said furnace to the cooler of the low pressure unit.

3. In an absorption refrigerating system, two absorption units operating at different pressures, and each of which have the usual generators, absorbers, condensers and coolers, the condenser of the low pressure unit serving as cooler of the high pressure unit, and means for regulating the operation of the high pressure unit by the heat discharged by the low pressure unit.

4. In an absorption refrigerating system, two absorption units operating at different pressures, each unit comprising the usual generators, absorbers, condensers and coolers, both generators being heated by the same source of heat, and the cooler of the high pressure unit receiving heat discharged by the condenser and absorber of the low pressure unit.

5. In an absorption refrigerating system, two absorption units operating in series combined in one sealed container one unit operating at high pressure and the other unit operating at a lower pressure, the condenser of the low pressure unit serving as cooler for the high pressure unit, automatic means for controlling the operation of the low pressure unit by the temperature of the cooler of said low pressure unit, and automatic means for controlling the operation of the high pressure unit by the temperature of the condenser of the low pressure unit.

6. A method of refrigeration by absorption systems for obtaining a wide difference between the temperature of the heat absorbed and the temperature of the heat discharged, using two of said absorption refrigerating systems in series, one at a high pressure and the other at a low pressure, absorbing in the high pressure system the heat discharged by the low pressure system and regulating the operation of the high pressure system by the heat discharged by the low pressure system.

7. A method of utilizing, and regulating the use of, heat generated by combustion, which consists of using said heat to raise the temperature of a generator of an absorption refrigerating machine, and also using said heat to raise the temperature of a cooler of said refrigerating machine, regulating the supply of heat to said cooler by the heat required, and using the heat discharged by said absorption refrigerating machine for heating purposes.

8. A method of refrigeration by absorption refrigerating systems for obtaining a wide difference between the temperature of the heat absorbed and the temperature of the heat discharged, using two of said absorption refrigerating systems in series, one at a high pressure and one at a low pressure, absorbing in the high pressure system the heat discharged by the low pressure system, regulating the operation of the high pressure system by the heat discharged by the low pressure system, and regulating the operation of the low pressure system by the heat supplied to the cooler of the low pressure system.

9. A heating system comprising a furnace, a flue for the gases of combustion of said furnace, an absorption refrigerating machine, a means for supplying heat to a generator of said refrigerating machine from said furnace, a space heated by the heat discharged by said refrigerating machine, a means for supplying heat to a cooler of said refrigerating machine from the flue gases of said furnace, and automatic means for regulating the supply of heat to said cooler.

10. A heating system comprising a furnace, a flue for the gases of combustion of said furnace, a supply of heat from the gases in said flue, an absorption refrigerating machine having one or more coolers, condensers, generators and absorbers a space heated by the heat discharged by a condenser and absorber of said refrigerating machine, means for regulating the operation of said refrigerating machine by the temperature of said space, and means for regulating the supply of heat from said flue gases of said furnace to a cooler of said refrigerating machine by the temperature of said cooler.

11. A heating system comprising in combination a furnace, and an absorption refrigerating machine containing one or more generators, condensers, coolers and absorbers, means for extracting heat from the flue gases of said furnace, means for applying said heat to a cooler of said refrigerating machine, means for using the heat discharged by a condenser and an absorber of said refrigerating machine for heating space, and means for regulating the heat supplied from said flue gases to said cooler, according to the heat required to be discharged by said condenser, to maintain a given temperature in said space which is being heated.

12. A heating system comprising in combination, a furnace, and an absorption refrigerating machine, having one or more generators and coolers, means for utilizing the heat discharged by a condenser and an absorber of said refrigerating machine for heating purposes, means for supplying heat to a generator of said machine from said furnace, and means for supplying waste heat from said furnace to a cooler of said machine, and means for regulating the amount of heat supplied to said cooler by the temperature of said cooler.

13. In an absorption refrigerating system, two absorption units operating at different pressures in series, each unit comprising a generator, absorber and condenser and cooler, the condenser of the low pressure unit serving as cooler of the high pressure unit, one unit operating at high pressure so that the temperature of the cooler of the high pressure unit will be controlled by the temperature of the condenser and absorber of the low pressure unit, means for controlling the circulation of the liquor in the high pressure unit by the temperature in the condenser of the low pressure unit.

14. Controlling flow of fluid in an absorption refrigeration system responsive to a temperature affected by the heat rejecting portions of said system, said system having a place of absorption and a place of condensation comprising the heat rejecting portions of the system and a generator and an evaporator comprising the heat input portions of the system, heat being transferred to said generator at a high temperature from a source of heat provided by combustion of fuel, and heat being transferred at a lower temperature to said evaporator from said source, whereby heat transferred by said system varies in accordance with demand for heat as indicated by said temperature.

15. In a heating system, a source of heat, a refrigeration system including a condenser and an evaporator, means for transferring heat from said condenser, means for transferring heat from said source to said evaporator, and means for regulating the transfer of heat to said evaporator responsive to the temperature of said evaporator.

16. In a heating system, a space to be heated, a source of heat, an absorption refrigeration system having heat input from said source and heat rejection to said space, mechanical means for causing circulation of fluid in said refrigeration system, and means for stopping said circulating means responsive to decrease in supply of heat from said source.

17. In a heating system, a space to be heated, a source of heat including a steam coil, an absorption refrigeration system having heat input from said source and heat rejection to said space, and means for stopping circulation of fluid in said refrigeration system responsive to decrease in pressure of steam in said coil.

18. In a heating system, control means for separately regulating supply of heat to the evaporator of an absorption refrigeration system, a place to be heated, and an absorption refrigeration system having an absorber and condenser arranged for providing heat for said place to be heated, and a generator and evaporator receiving heat at a high and low temperature respectively from a source of heat, the supply of heat to said evaporator being separately regulated by said control means.

JAMES L. GETAZ.